United States Patent [19]

Cohen

[11] Patent Number: 5,751,273
[45] Date of Patent: May 12, 1998

[54] GAME CONTROLLER FOR INFANTS

[76] Inventor: Allen L. Cohen, 10010 Walsham Ct., Richmond, Va. 23233

[21] Appl. No.: 640,330

[22] Filed: Apr. 30, 1996

Related U.S. Application Data

[63] Continuation-in-part of Ser. No. 349,686, Dec. 5, 1994, abandoned.

[51] Int. Cl.[6] .................. G09G 5/00; A63F 9/24
[52] U.S. Cl. .................. 345/156; 463/1; 463/7; 463/37
[58] Field of Search .................. 345/156; 463/1, 463/7, 37

[56]        References Cited

U.S. PATENT DOCUMENTS

| Re. 33,662 | 8/1991 | Blair et al. | 463/3 |
|---|---|---|---|
| 4,540,176 | 9/1985 | Baer | 463/37 |
| 4,817,950 | 4/1989 | Goo | 463/7 X |
| 5,138,535 | 8/1992 | Aragon, Jr. | 362/102 |
| 5,488,362 | 1/1996 | Ullman et al. | 463/37 X |
| 5,556,339 | 9/1996 | Cohen | 463/1 |
| 5,603,658 | 2/1997 | Cohen | 463/1 |
| 5,647,796 | 7/1997 | Cohen | 463/1 |

OTHER PUBLICATIONS

The MacAuthority, The Cobb Group, Dec. 1993, vol. 2, No. 12.

Primary Examiner—Raymond J. Bayerl
Assistant Examiner—Seth D. Vail

[57]         ABSTRACT

A computer input device or wand that may be held and controlled by an infant, a toddler, or an adult who cannot use a conventional input device. An elongated handle is provided for gripping and manipulating the input device. The handle may conform to the size of a baby's hand to allow the input device to be securely held by a baby. The input device or wand includes an omnidirectionally responsive transducer for actuating an electrical control signal in response to each unidirectional sweep of the wand in a plane perpendicular to the axis of the handle, thereby allowing the user to control a computer display by shaking the wand in the same manner as a baby might shake a rattle.

20 Claims, 8 Drawing Sheets

GAME CONTROLLER FOR INFANTS

This application is a continuation-in-part of application Ser. No. 08/349,686, filed Dec. 5, 1994 abandoned.

BACKGROUND OF THE INVENTION

I. Field of the Invention

The present invention relates generally to computer input devices such as those used in conjunction with a video game and/or personal computer to alter the display of the video game and/or computer, and more particularly to computer input devices that can be easily manipulated by infants and toddlers and which are responsive to the distinctive hand motions characteristic of infants and toddlers.

II. Description of Related Art

In computer controlled display systems, it is often necessary to allow a user to control certain aspects of the display with an input device. Standard computer input devices include keyboards, joysticks, track balls, mice, and graphics tablets. Each input device is tailored for a particular application. With a keyboard the user sends information to the computer by striking one or more keys on the keyboard. Where X-Y position information is required, it is generally more convenient to use an input device such as a mouse where the user sends information to the computer by a controlled movement of the device itself. The data sent by these input devices consists of passive or active electrical control signals. Many input devices generate a series of square wave pulses where the width and spacing of the pulses represents a digital code that can be interpreted by the central processing unit of the computer.

BRIEF SUMMARY OF THE INVENTION

I. Nature and Substance of the Invention

While some standard computer input devices such as keyboards and mice are highly useful and successful they are generally not appropriate for an infant or toddler. An adult user has the dexterity and eye-hand coordination necessary to manipulate and control these devices, however, a baby (i.e. infant or toddler) is not so privileged. Moreover, because of the small size of a baby's hand, a baby may not even be able to grip an input device designed for an adult.

Nevertheless, infants and toddlers possess the intellect and ability necessary for meaningful interaction with a computer. Although infants and toddlers have tiny hands they have good grasping ability. Moreover, while they may lack precision eye-hand control they are generally able to use their hands to make controlled shaking motions. In fact, one of the first toys that an infant or toddler is given to play with is a rattle because of a baby's ability to make controlled shaking motions. Thus, the limitations that a baby faces regarding computer interaction are not inherent, but rather imposed by the presently available input devices.

Recently, a number of simple interactive computer programs for infants and toddlers have been offered for sale in the commercial market. These programs display various shapes and sounds in response to random key strikes made by an infant or toddler banging on the keyboard. However, even this type of hand coordination is difficult for a baby to master. Moreover, it is not ideal to allow an infant or toddler to play with a computer keyboard that may be easily damaged by dirt, drool, or banging.

To overcome these difficulties, the present invention is a computer input device in the form of a rattle or wand having a handle designed to be easily and securely held by a baby. In addition, the present invention includes a transducer that allows the baby to send control signals to the computer by shaking the input device in the same manner as the baby might shake an ordinary infant's rattle.

II. Objects of the Invention

It is an object of the present invention to provide a computer input device that may be readily used by infants and toddlers.

Another object of the present invention is to provide a computer input device with a handle by which infants and toddlers may easily grasp and manipulate the input device.

Still a further object is to provide a computer input device with a transducer responsive to hand motions, such as simple shaking, rattling, and jiggling motions, which are easily performed and controlled by an infant or toddler.

Another object of the present invention is to provide a computer input device that may be used by adults who cannot use conventional computer input devices.

Additional objects and advantages of the invention are set forth in the drawings, description, and claims which follow. Some objects and advantages will be obvious from the instrumentalities and combinations particularly pointed out while other objects and advantages may be learned by the practice of the invention.

BRIEF DESCRIPTION OF THE DRAWINGS

The following drawings, which are incorporated in and constitute a part of the specification, serve to explain the principles of the present invention when they are taken together with the general description given above and the detailed description of the preferred embodiments given below. Moreover, the aforementioned objects and advantages of the present invention, as well as additional objects and advantages thereof, will become apparent when consideration is given to the following detailed description which should be read in conjunction with the following drawings wherein.

DETAILED DESCRIPTION OF THE INVENTION

A computer input device having particular application for use by infants and toddlers in conjunction with a computer display system is disclosed. In the following description well known systems are shown in diagrammatic or block diagram form in order not to obscure the present invention unnecessarily. Moreover, this specification sets forth many specific details, numbers, materials, and configurations only for purposes of explanation and to provide a thorough understanding of the present invention. However, it is apparent to one skilled in the art that the present invention may be practiced by application of numerous modifications obvious to those skilled in the art without making use of the specific materials and details shown and described.

Figure 1:
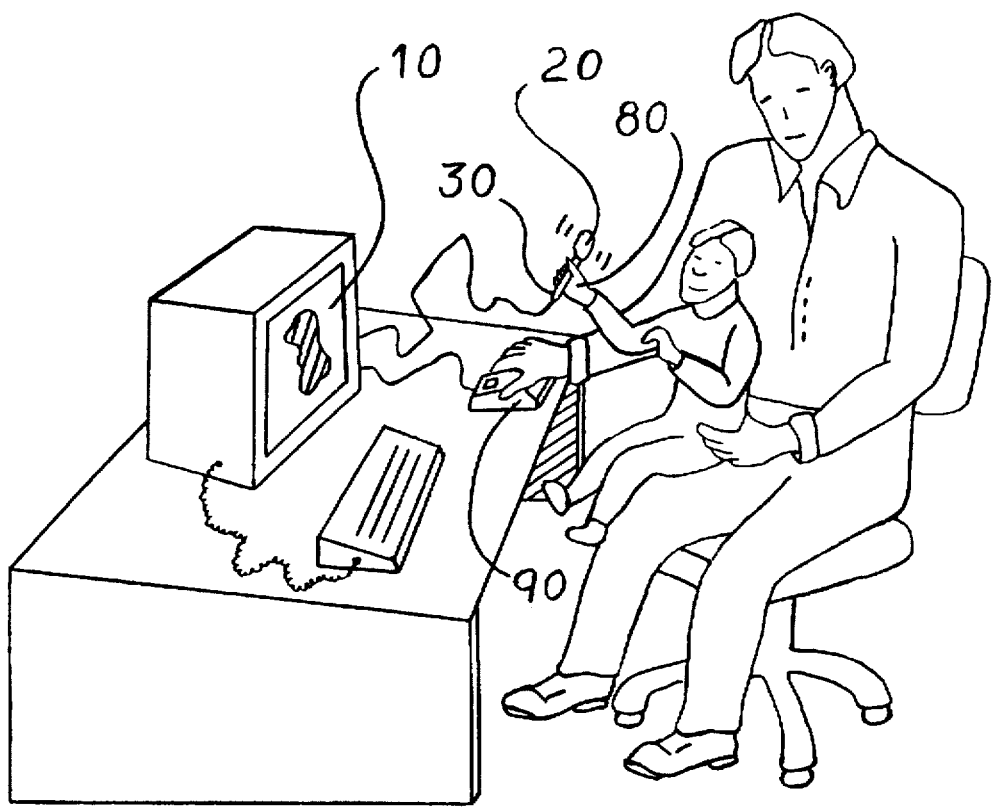
FIG. 1 is a perspective view of a baby seated in the lap of an adult, with the adult using a standard input device to control the computer while the baby is using a computer wand of the present invention to control the computer.

In FIG. 1 we see a baby interacting with the screen display 10 on a computer screen by holding and shaking one embodiment of the computer wand 20 of the present invention. The baby is seated on the lap of an adult who is simultaneously interacting with the screen display 10 by using a standard computer mouse 90. It is evident from the scale of FIG. 1 that the computer wand 20 of the present invention is designed with a handle 30 small enough the fit within the palm of the baby's hand 80 while the mouse 90 is too large to be easily grasped and manipulated by the baby.

Figure 2:
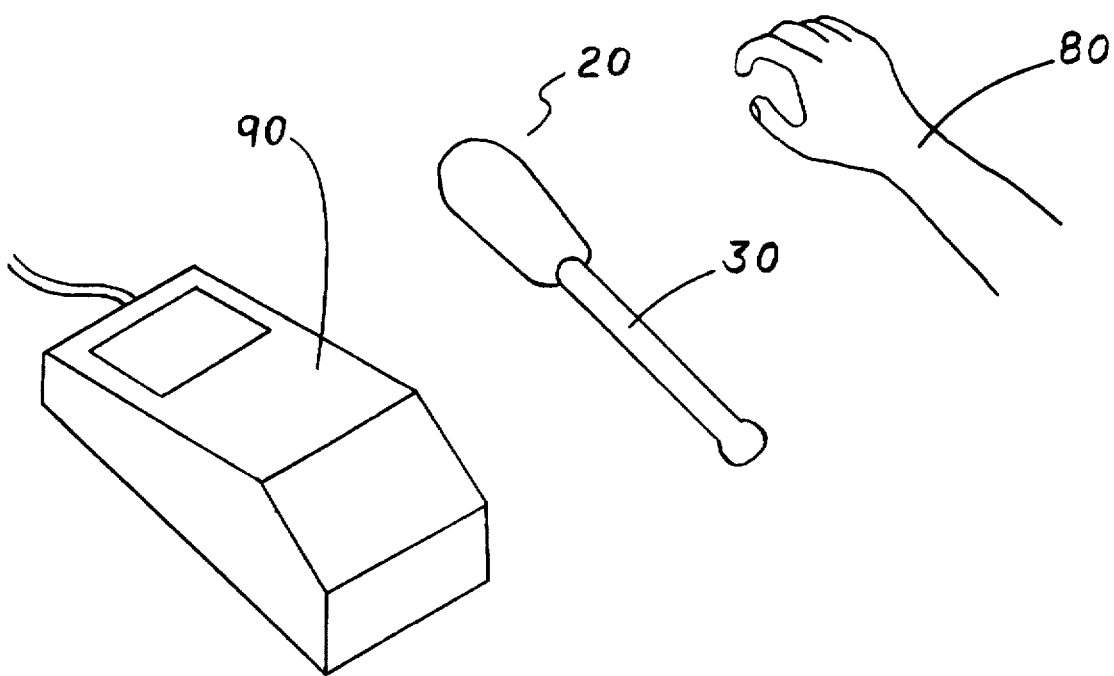
FIG. 2 is a perspective view of a standard input device, one embodiment of the computer wand of the present invention, and a baby's hand all drawn to the same scale.

Referring now to FIG. 2, we see illustrated a typical computer mouse 90, one embodiment of the computer wand of the present invention 20, and a baby's hand 80 all drawn to the same scale. A typical computer mouse 90 is configured with a blocky shape having dimensions of about 100 mm by 50 mm by 25 mm. However, a baby's hand 80, as can be seen from FIG. 2, is usually too small to easily grasp a mouse of such shape and size. The computer wand of the present invention has a handle 30 for gripping and manipulating the wand. To be held and controlled by a baby, the handle must have dimensions considerably smaller than those of a typical computer mouse. To be sized and shaped to fit an infant's hand, the handle of a preferred embodiment should have an elongated portion of about 35 mm or longer within which no cross-sectional circumference of the handle is greater than about 55 mm.

The present invention not only has a handle specially designed for an infant or toddler, but also includes a transducer responsive to simple hand motions, such as shaking, rattling, and jiggling, which are easily performed and controlled by an infant or toddler. Moreover, the transducer of the present invention is omnidirectionally responsive to each sweep of a shaking motion allowing complete and immediate feedback to a baby using the wand of the present invention. The combination of both of these elements, the handle and the transducer, makes the present invention particularly useful. Note, for example, that while some standard input devices such as joy sticks may be easily gripped by an infant or toddler, those input devices have transducers that require precisely coordinated hand movements beyond the skills of the typical infant or toddler.

Figure 3:
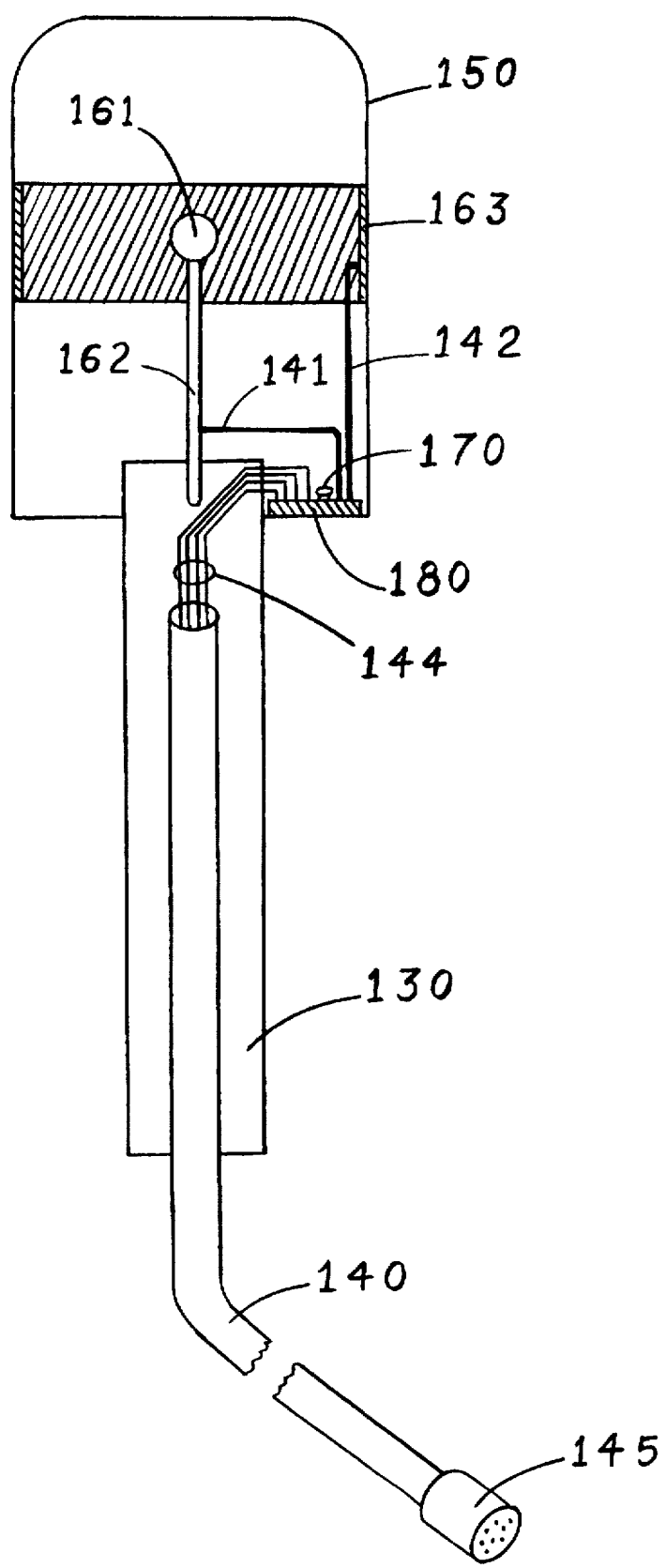
FIG. 3 is a cross-sectional view of a computer wand showing a transducer means comprising a discrete inertial mass coupled to the handle of the computer wand by a wire spring according to one preferred embodiment of the present invention.

The embodiment of FIG. 3 depicts, in cross-section, a computer wand of the present invention including: a handle 130 for gripping and manipulating the wand; a housing 150, rigidly attached to the handle 130, within which is contained a transducer that generates electrical control signals in response to shaking motions of the wand; and an insulated flexible cable 140, carrying electrical wires 144 from the transducer, extending from the handle and terminating in a connector 145 so that the electrical control signals may be sent from the transducer to the computer. The connector 145 may be configured to fit a serial port, a parallel port, a special mouse port, or any other input/output port through which it may be desirable for the wand to communicate with the computer.

The housing and handle of this embodiment are rigidly attached to one another, allowing this embodiment to be constructed without any crevices or opening which might catch or pinch a baby's fingers. This safety feature would also be inherent in an embodiment wherein the handle also functioned as a housing for the transducer so as to eliminate the need for a housing separate from the handle.

It should also be noted that while in this embodiment the electrical control signals are sent from the wand to the computer by way of an insulated electrical cable, the control signals may also be passed to the computer by infrared wireless transmission. Other modes of wireless transmission may also be used including radio frequency transmission outside the infrared spectrum and even acoustic transmission.

The particular transducer of the embodiment shown in FIG. 3 comprises: a metal ball 161; a metal spring pin 162 which connects the metal ball 161 to the handle 130 and acts as an electrically conductive spring mechanically coupling the ball and the handle; a switch contact 163 in the form of a band of electrically conductive material covering an annular circumference of the inside wall of the housing 150; and an electrical circuit 170 mounted on a circuit board 180 fixed within the housing 150.

At one of its ends the metal spring pin 162 is rigidly attached to the metal ball 161 while at its other end it is rigidly anchored to the handle 130 and electrically connected by a first lead 141 to the electrical circuit 170 via the circuit board 180. In this configuration, the spring will set the ball into vibrational motion, limited in extent by the walls of the housing 150, when the wand is shaken back and forth. The electrically conductive band 163 lining the inside of the housing 150 is electrically connected by a second lead 142 to the electrical circuit 170 via the circuit board 180. Thus, when the metal ball strikes the electrically conductive band a short circuit path exhibiting electrical continuity through the metal pin 162, the metal ball 161, and the electrically conductive band 163 will appear between the first and second leads 141 and 142. In this case the switch circuit is said to be closed. Otherwise, leads 141 and 142 will present an open circuit and the switch circuit is said to be open.

Figure 4:
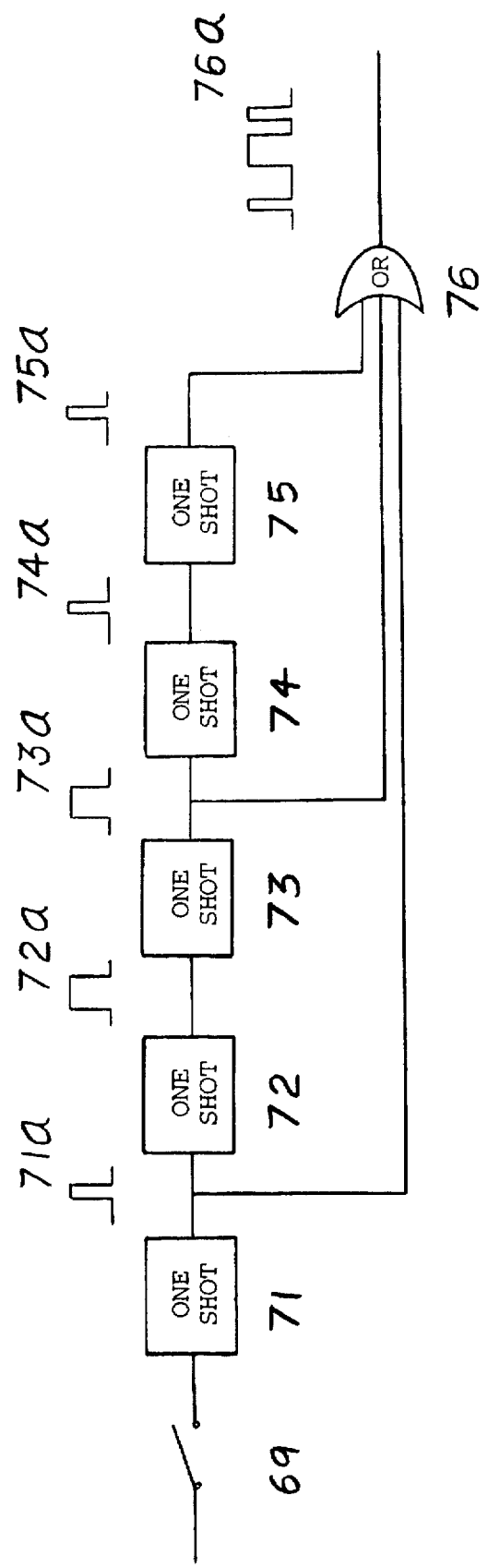
FIG. 4 is a block diagram of an electrical circuit that generates an electrical control signal comprising a series of timed square wave pulses to simulate the input of a standard computer input device.

The electrical circuit 170 is designed to send the computer an electrical control signal whenever the switch circuit is closed. This control signal may be a short circuit providing electrical continuity across two output leads, a voltage level that may be sensed by a software driver installed within the computer, or a specific sequence of square wave pulses that emulates a standard computer input device corresponding to one of the computer's existing drivers. A sequence of precise width pulses may, for example, be generated by the use of a series of one-shot Schmitt triggers, each one designed so that its output is a square wave of a precise width. FIG. 4, illustrates in block diagram form one example of this type of circuit configuration. Because the one-shots 71, 72, 73, 74, and 75 of FIG. 4 are in series with one another, the output pulse 71a from one-shot 71 will trigger one-shot 72, the output pulse 72a from one-shot 72 will trigger one-shot 73, and so on. In this way, a series of precise width pulses will be generated each time the switch 69 is closed. In the specific example of FIG. 4, the output from one-shots 71, 73, and 75 are ORed together by the OR gate 76 to produce the desired output control signal 76a.

Figure 5A:
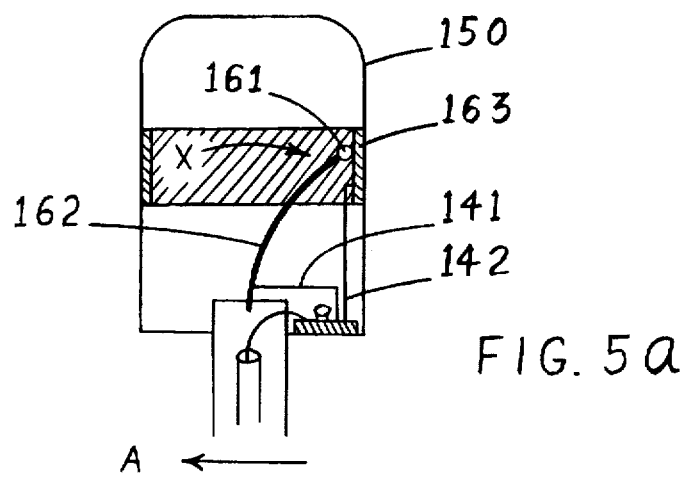
FIGS. 5a through 5c are cross-sectional views of the computer wand of FIG. 3 depicting the metal ball and spring pin responding to a shaking motion applied to the computer wand.
Figure 5B:
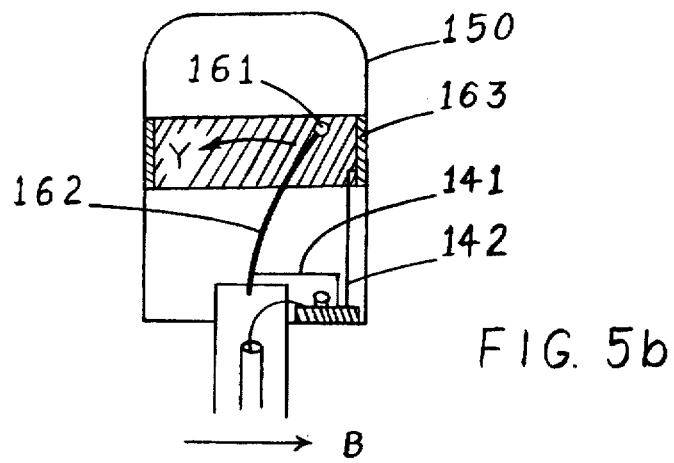
Figure 5C:
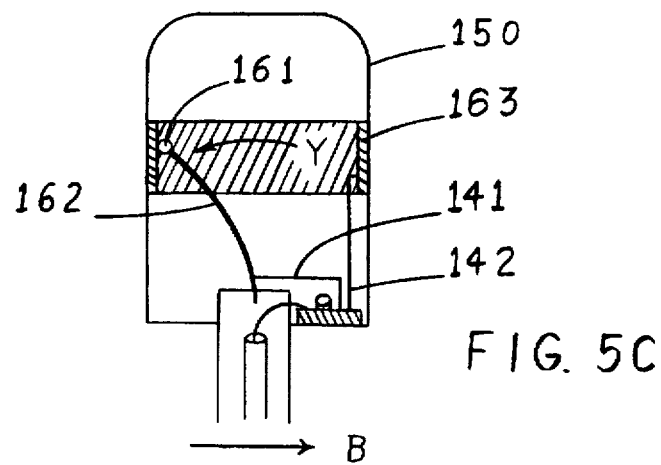

Since it is not rigidly fixed to the handle, the metal ball 161 will tend to move relative to the housing 150 whenever the wand is shaken back and forth. Because the spring is in the form of a cylindrical pin it is equally able to flex in any direction transverse to its cylindrical axis. Therefore, depending on the motion of the wand, the metal ball may oscillate back and forth in various directions. Referring now to FIGS. 5a through 5c, the effects of shaking the wand back and forth become apparent. We see, for example, that when the wand is swept in a first direction A the ball 161 will move in an opposite direction X relative to the housing 150 until it strikes the switch contact 163 closing the switch circuit between leads 141 and 142 (see FIG. 5a). If the motion of the wand is then stopped and reversed so that it moves in direction B the ball 161 will also reverse its direction of motion. First, under the bias of the spring 162 the ball 161 will rebound in the direction Y away from the switch contact thereby opening the switch circuit (see FIG. 5b). Then as the wand is swept in the direction B the ball 161 will continue in the direction Y until it again strikes the switch contact 163 closing the switch circuit one more time (see FIG. 5c). Each time the switch is closed it actuates the electrical circuit 170 of FIG. 3 which then generates an electrical control signal that is sent to the computer. Thus, in this particular embodiment where the metal spring pin is coaxially aligned with the elongated handle, a control signal will be transmitted to the computer for each unidirectional back and forth sweep of any shaking motion imparted upon the housing in a plane perpendicular to the axis of the handle. This direct one-to-one correlation between each sweep of a shaking motion and the generation of an electrical control signal allows for precise and immediate feedback to a baby using the wand of the present invention.

Another feature of this embodiment is its omnidirectional response to any shaking motion in a plane perpendicular to the axis of the elongated handle. Because a baby cannot generally control her hand movements with sufficient precision to confine them to particular linear directions, the omnidirectional responsiveness of this embodiment of the present invention is particularly advantageous.

In appropriate cases, a software driver may be installed in the computer to count and time the control signals and then pass the results to a software application running on the computer. Alternatively, the computer wand itself could perform some counting and timing functions. In one embodiment, for example, the electrical circuit within the computer wand would include a digital counter circuit so that the control signal would only be activated after each sequence of shakes exceeding a fixed number of unidirectional sweeps of a shaking motion. In another embodiment, the electrical circuit would also include a crystal controlled circuit setting a clock rate so that the control signal would only be activated after each sequence of shakes exceeding a fixed number of unidirectional sweeps of a shaking motion that occur within a fixed time interval.

Figure 6:
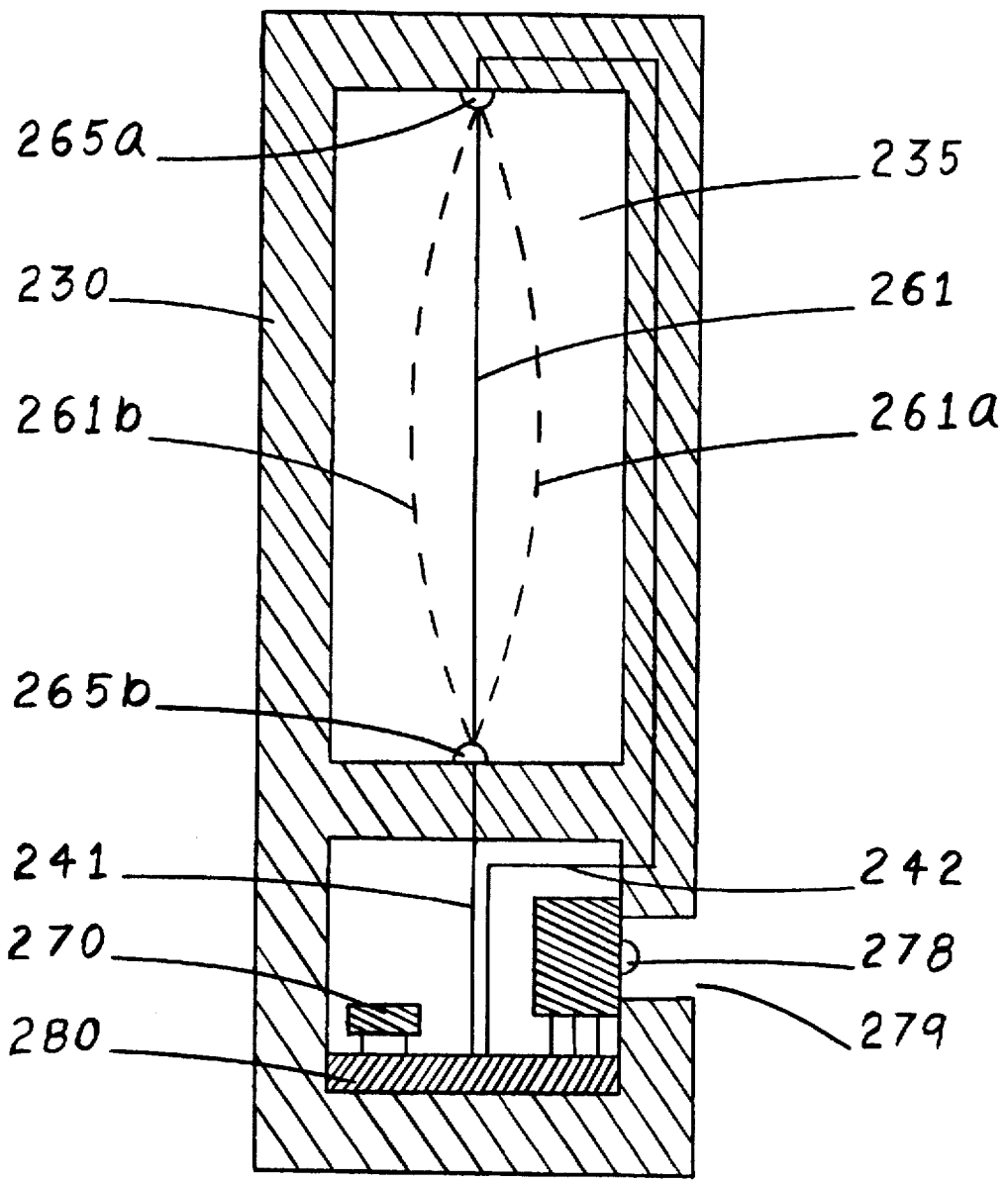
FIG. 6 is a cross-sectional view of a computer wand illustrating a transducer means comprising a piezoelectric spring pin (shown in a flexed and unflexed state) within an elongated chamber located inside the handle of the computer wand according to another preferred embodiment of the present invention.

FIG. 6 depicts another embodiment of the present invention. In this case, a tubular chamber 235 is located inside an elongated handle 230. A first contact point 265a is located at one end of the tubular chamber 235 and second contact point 265b is located at the other end of the tubular chamber 235 with the opposite ends of a piezoelectric spring pin 261 electrically attached to these contact points. The contact points 265a and 265b are connected to an electrical circuit 270, mounted on a circuit board 280, by conducting leads 241 and 242. Thus, whenever the piezoelectric spring pin 261 is sufficiently flexed an electrical voltage will appear between the two contact points 265a and 265b and therefore also between the leads 241 and 242 thereby activating the electrical circuit 270.

As long as the piezoelectric spring pin 261 is sufficiently pliable, it will flex in response to any back and forth shaking motion in a plane perpendicular to its axis. Thus, in this particular embodiment where the spring pin is coaxially aligned with the elongated handle, it will flex back and forth between the ghosted positions 261a and 261b whenever the wand is shaken back and forth in any plane perpendicular to the axis of the handle. Since the piezoelectric spring pin in this configuration will generate and send an electrical voltage to electrical circuit 270 whenever it is sufficiently flexed, electrical control signals will be actuated by the electrical circuit for each directional back and forth shaking motion in a plane perpendicular to the axis of the handle.

The control signals generated by this embodiment are intended to be passed to a computer by wireless transmission. Thus FIG. 6 illustrates an infrared diode 278 within an aperture 279 in the handle to allow for wireless control implementation. Alternatively, other modes of wireless transmission may be used.

Finally, it should be emphasized that this embodiment of the present invention generates identical control signals regardless of the direction the wand is shaken as long as the direction is within the plane perpendicular to the axis of the handle. Moreover, these signals are identically transmitted to the computer since there is no need for directional information to be conveyed by this device. Because all of the control signals are identically generated and transmitted to the computer, this embodiment of the present invention is particularly simple to manufacture.

Figure 7:
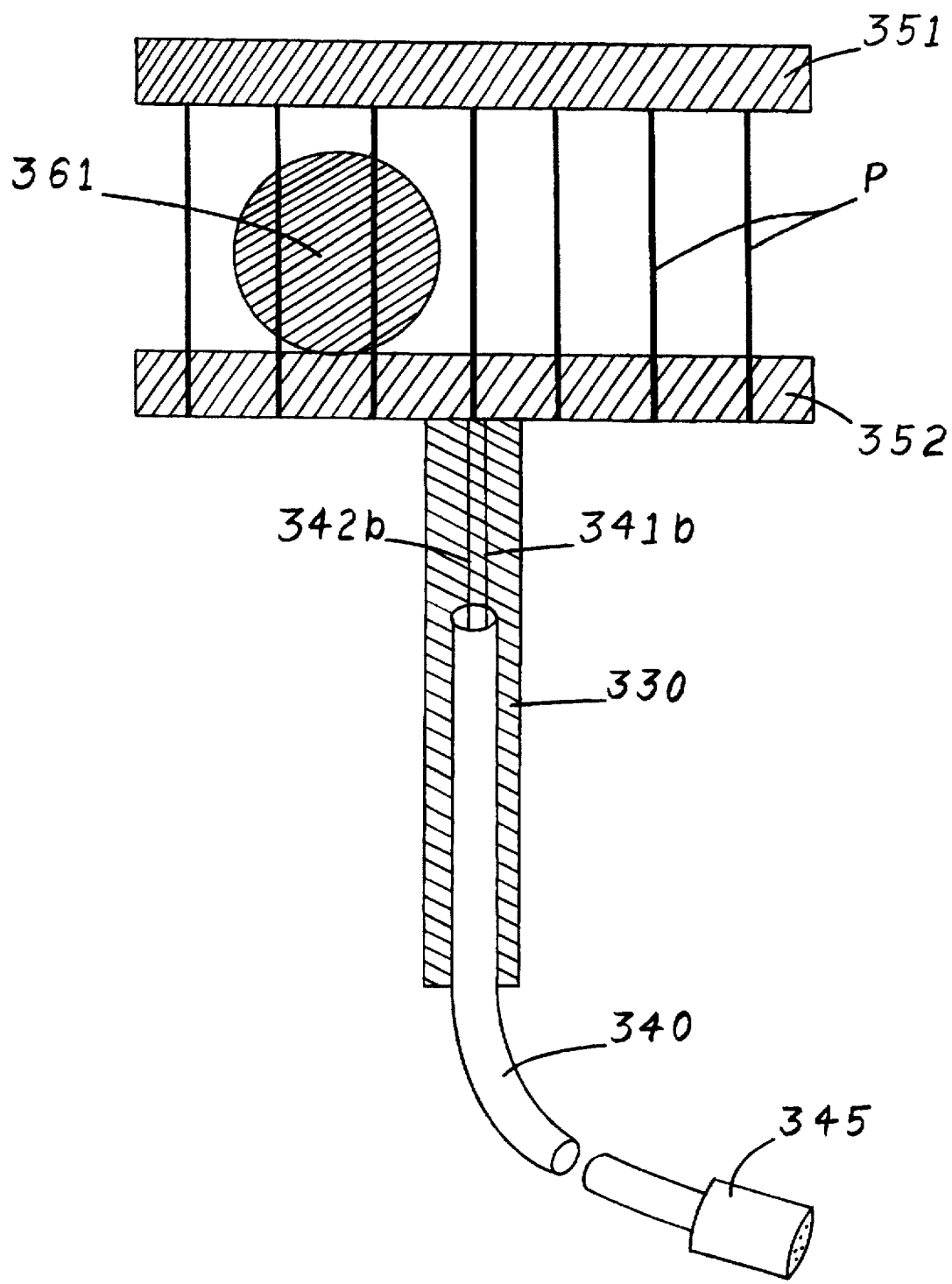
FIG. 7 is a cross-sectional view of a computer wand illustrating a transducer means comprising a group of parallel electrically conductive pins which are circularly arranged between an upper and lower wall to form a housing that encompasses a loosely contained conductive sphere according to another preferred embodiment of the present invention.
Figure 8A:
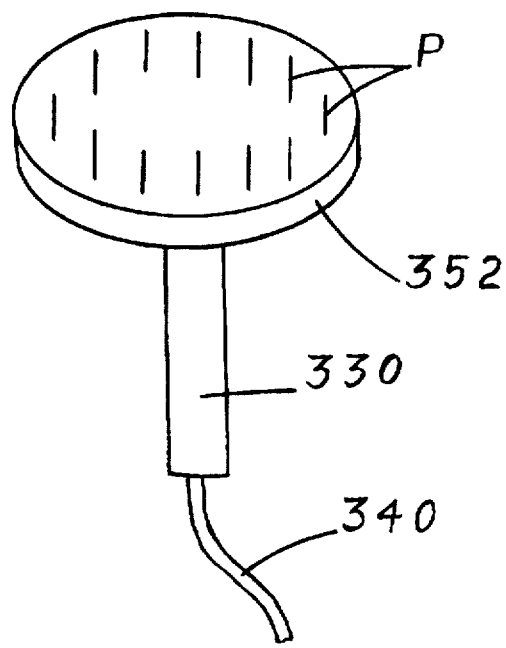
FIG. 8a is a perspective view of the embodiment of FIG. 7 with the upper wall of the housing removed.
Figure 8B:
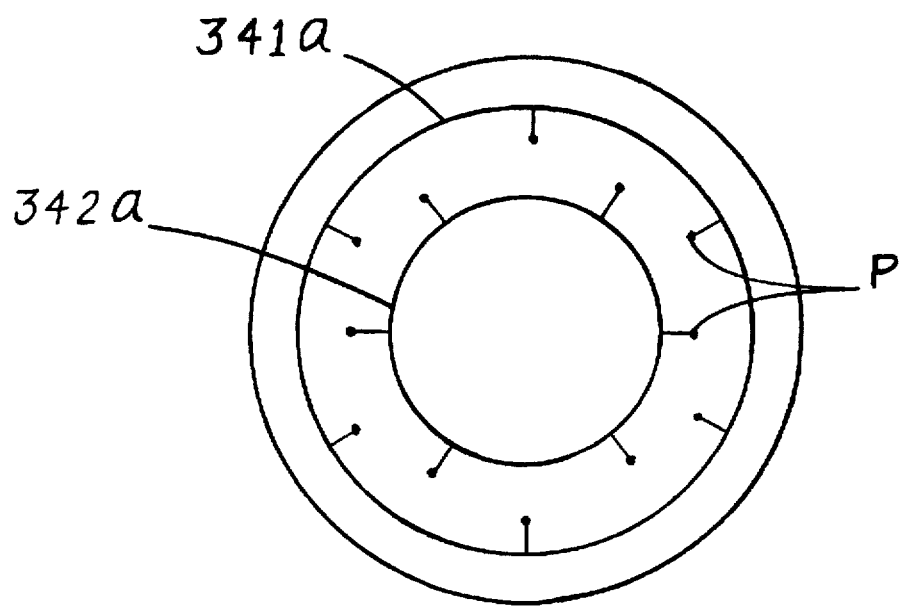
FIG. 8b is a bottom view of the lower wall of the housing of the embodiment of FIG. 7 illustrating the electrical configuration of the conductive pins of this embodiment showing that adjacent pins are electrically isolated from one another while alternate pins are electrically connected to one another so as to form two electrically isolated sets of electrically connected pins.

FIG. 7 depicts yet another embodiment of the present invention. In this example, the invention includes a housing comprising a nonconductive upper wall 351 and a nonconductive lower wall 352 joined together by a group of spaced parallel electrically conductive pins P which are circularly arranged to form a fenced-in region. The physical arrangement of the pins is easier to visualize be reference to FIG. 8a which is a perspective view of this embodiment with the upper wall of the housing removed. As shown in FIG. 8b, which is a bottom view of lower wall 352 of the housing, the conductive pins pass though the bottom of lower wall 352 where adjacent pins are electrically isolated from one another while alternate pins are electrically connected to one another by conducting wires 341a and 342a so as to form two electrically isolated sets of electrically connected pins. Conducting wires 341a and 342a are connected to conducting leads 341b and 342b respectively (shown in FIG. 7) which are carried within an insulated flexible cable 340, extending from the handle 330 and terminating in a connector 345 so that control signals may be sent to the computer.

Returning to FIG. 7, an electrically conductive sphere 361, with a diameter less than the distance between the upper and lower walls but greater than the spaces between adjacent pins, is located within the closed off region formed by the upper and lower walls and the pins. The electrically conductive sphere, while constrained to the closed off region, is free to move anywhere within the closed off region in response to a shaking motion imparted to the housing. Thus, the electrically conductive sphere will roll back and forth in response to any shaking motion imparted to the housing, whereby it will intermittently make electrical contact between adjacent electrically conductive pins each time it bounces against the fence of electrically conductive pins. This electrical contact will cause a short circuit to appear between the two electrically isolated sets of electrically connected pins and therefore also between the conducting leads 341b and 342b thereby effectuating a control signal in response to any shaking motion imparted to the housing.

Thus, an improved computer input device has been disclosed. The present invention permits an infant or toddler to interact with a computer display system more easily than has been previously been possible by making simple shaking movements with his or her hand.

Regarding the above description, it should be realized that the precise dimensional relationships shown and described for the handle of the invention may be readily altered in varying degrees while achieving the essential objectives of the invention. Furthermore, numerous modifications of the transducer, including changes to the materials specified and the configurations shown and described, will readily occur to those skilled in the art. Such changes may include using accelerometers or other devices as equivalent transducers or making changes to the coupling mechanisms, electrical circuits, and switches of the particular transducers shown and described. It is therefore, not desired to limit the invention to the exact construction and operation shown and described, and accordingly, all suitable modifications and equivalents are intended to be encompassed by the present invention the scope of which is indicated by the appended claims.

What is claimed and desired to be protected by Letters Patent of the United States is as follows:

1. A computer input device that enables a baby to interact with software installed on a computer, comprising:
    (a) a housing;
    (b) an electro-mechanical transducer, omnidirectionally responsive in a two dimensional plane to a mechanical shaking motion of said housing in said two dimensional plane, the transducer output comprising an electrical signal;
    (c) a pulse generator, activated by said electrical signal, the pulse generator output comprising a substantially identical computer control signal each time it is activated by said electrical signal; and
    (d) a transmitter, activated by said computer control signal, the transmitter output comprising an identically encoded version of said computer control signal each time it is activated by said computer control signal, whereby the baby may interact with the software installed on the computer by holding and shaking said housing.

2. A computer input device according to claim 1, wherein said transmitter comprises a sonic wave transmitter and said transmitter output comprises said computer control signal encoded into sound waves.

3. A computer input device according to claim 1, wherein said transmitter comprises an infrared wave transmitter and said transmitter output comprises said computer control signal encoded into infrared waves.

4. A computer input device according to claim 1, wherein said transmitter comprises a radio frequency transmitter and said transmitter output comprises a radio frequency encoded version of said computer control signal.

5. A computer input device that enables a baby to interact with software installed on a computer, comprising:
    (a) a housing;
    (b) a transducer means, omnidirectionally responsive in a two dimensional plane to a back and forth shaking motion of said housing, for generating a driving signal in response to each sweep of said shaking motion that occurs in any any direction within said two dimensional plane; and
    (c) a transmission means, activated by said driving signal, for transmitting a substantially identical computer control signal each time it is activated by said driving signal, whereby the baby may interact with the software installed on the computer by holding and shaking said housing.

6. A computer input device according to claim 5, wherein said transducer means comprises a switch circuit wherein said driving signal is generated by the opening and closing of said switch circuit in response to said shaking motion.

7. A computer input device according to claim 6, wherein said switch circuit comprises (i) a band of electrically conductive material affixed within said housing to form a circular perimeter and (ii) an electrically conductive spring with first and second ends, said first end affixed to said housing and said second end located within said circular perimeter free to vibrate in response to said back and forth shaking motion, such that said free end of said spring may intermittently contact said band of electrically conductive material thereby opening and closing said switch circuit.

8. A computer input device according to claim 6, wherein said switch circuit comprises (i) a group electrically conductive pins configured as a fence of pins enclosing a fenced-in region wherein adjacent pins are electrically isolated from one another while alternate pins are electrically connected to one another so that said fence of pins comprises two electrically isolated interleaved sets of electrically connected pins and (ii) an electrically conductive mass of a size greater than the spaces between said adjacent pins and located within said fenced-in region, said electrically conductive mass free to move in response to said back and forth shaking motion, such that said electrically conductive mass may intermittently make electrical contact between adjacent electrically conductive pins thereby opening and closing said switch circuit.

9. A computer input device according to claim 5, wherein a tubular chamber is located within said housing, and wherein said transducer means comprises a piezoelectric spring pin having a first and second end, said first and second ends oppositely disposed and affixed within said tubular chamber of said housing such that said piezoelectric spring pin is coaxially aligned with the axis of said tubular chamber and is free to flex in response to said back and forth shaking motion, wherein said driving signal comprises the electrical output of said piezoelectric spring pin generated in response to said shaking motion of said computer input device in a plane perpendicular to the axis of said tubular chamber.

10. A computer input device according to claim 5, wherein said transmission means comprises an insulated electric cable that carries said computer control signals directly to the computer.

11. A computer input device according to claim 5, wherein said transmission means comprises a wireless transmitter for transmitting said computer control signals.

12. A computer input device according to claim 11, wherein said wireless transmitter operates by sonic transmission.

13. A computer input device according to claim 11, wherein said wireless transmitter operates by infrared transmission.

14. A computer input device according to claim 11, wherein said wireless transmitter operates by radio frequency transmission.

15. A computer input device that enables a baby to interact with software installed on a computer, comprising:

(a) a housing;

(b) an electro-mechanical transducer, omnidirectionally responsive in a two dimensional plane to a mechanical shaking motion of said housing in said two dimensional plane, the transducer output comprising an electrical signal;

(c) a transmitter, activated by said electrical signal, the transmitter output comprising a substantially identical computer control signal each time it is activated by said electrical signal, whereby the baby may interact with the software installed on the computer by holding and shaking said housing.

16. A computer input device according to claim 15, further comprising a handle whereby the baby may easily grip the input device so that a back and forth shaking motion may be easily imparted unto said housing.

17. A computer input device according to claim 15, wherein said transducer means comprises a switch circuit wherein said electrical signal is generated by the opening and closing of said switch circuit in response to said shaking motion.

18. A computer input device according to claim 15, wherein said transmitter comprises a sonic wave transmitter and said transmitter output comprises said computer control signal encoded into sound waves.

19. A computer input device according to claim 15, wherein said transmitter comprises an infrared wave transmitter and said transmitter output comprises said computer control signal encoded into infrared waves.

20. A computer input device according to claim 15, wherein said transmitter comprises a radio frequency transmitter and said transmitter output comprises a radio frequency encoded version of said computer control signal.

* * * * *